Dec. 15, 1925.  
J. R. KING  
1,566,216  
WINDSHIELD CONTROL DEVICE  
Filed Sept. 17, 1923
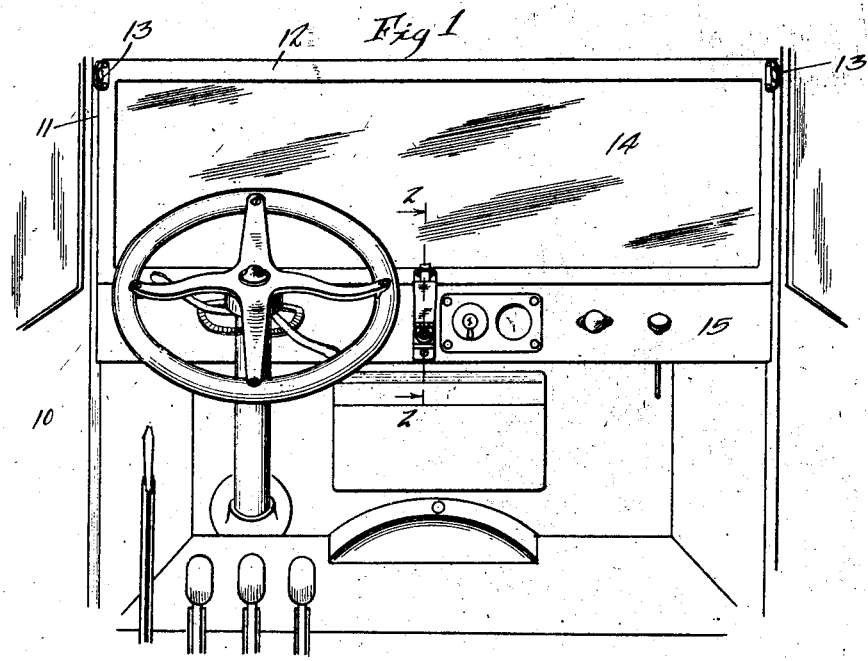
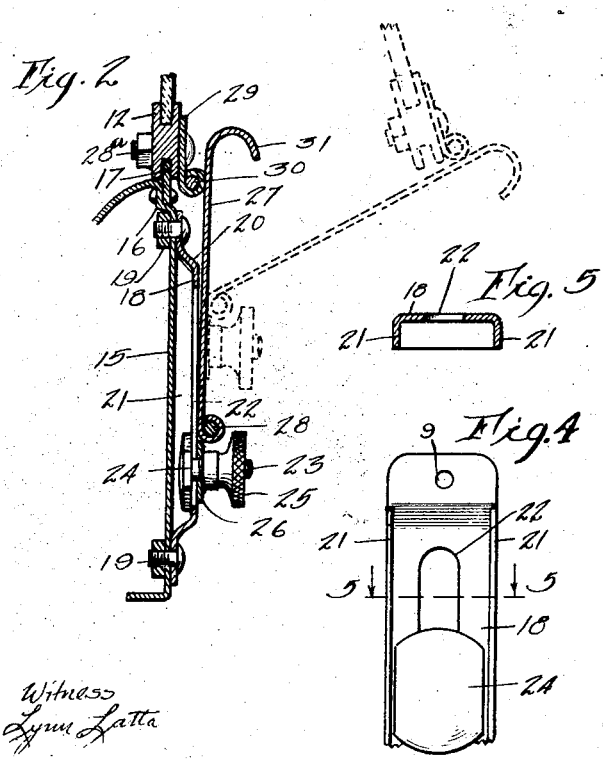
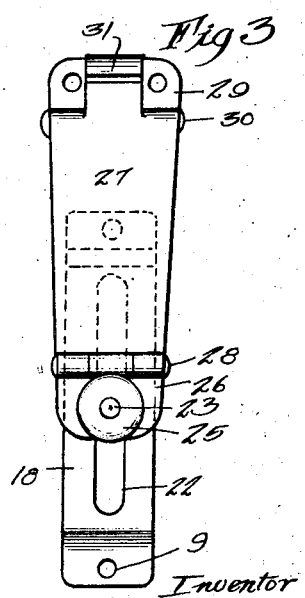
Witness
Lynn Latta
Inventor
John R. King
By Bair & Freeman Patented Dec. 15, 1925.

1,566,216

UNITED STATES PATENT OFFICE.

JOHN R. KING, OF RUTHVEN, IOWA.

WINDSHIELD-CONTROL DEVICE.

Application filed September 17, 1923. Serial No. 663,104.

*To all whom it may concern:*

Be it known that I, JOHN R. KING, a citizen of the United States, and a resident of Ruthven, in the county of Palo Alto and State of Iowa, have invented a certain new and useful Windshield-Control Device, of which the following is a specification.

The object of my invention is to provide a wind shield control device for use upon automobiles, preferably of the sedan type, for locking the wind shield in any of its various positions, the parts being of simple, durable and comparatively inexpensive construction.

More particularly, my invention relates to a control device secured to the dash of the automobile and to the wind shield thereof, wherein the wind shield may be opened or locked in any of its desired positions, by using one hand to perform the necessary work required in opening and locking the wind shield.

Still a further object is to provide a control device wherein the wind shield will be positively locked in any of its positions.

Still a further object is to provide means hingedly connected to a wind shield and hingedly and slidably connected to the dash of the automobile for controlling the wind shield and for locking it in any of its positions.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of the interior of a portion of an automobile with my improved control device thereon.

Figure 2 is a sectional view taken on line 2—2 of Figure 1, one of the positions of the control device being shown in dotted lines.

Figure 3 is a front view of the wind shield control device.

Figure 4 is a rear view of the back side of a portion of the device; and

Figure 5 is a sectional view taken on line 5—5 of Figure 4.

In the accompanying drawings I have used the reference numeral 10 to indicate generally an automobile body which is provided with a frame 11 to which the wind shield frame 12 is pivotally fixed, as at 13. The wind shield frame 12 has placed therein a plate glass 14.

Below the wind shield frame 12 is the dash 15, which is formed with a weather strip 16 near its upper edge. The weather strip 16 is designed to extend partially into a groove 17 formed in the under side of a portion of the frame 12, as clearly shown in Figure 2 of the drawings.

In order to swing the wind shield inwardly for opening the same, it is necessary to first raise the wind shield upwardly until the frame clears the weather strip 16, at which time the wind shield will be capable of pivotal movement.

The parts just described are of the ordinary construction.

My device consists of a dash plate 18 secured in position upon the dash 15 by the bolts 19. The bolts 19 extend through openings 9 formed in the dash plate 18.

The dash plate 18 is formed with offset portions 20 so that the main body portion of the dash plate 18 is spaced away from the dash 15.

The side edges of the dash plate 18 are inturned, as at 21, so that when the dash plate 18 is mounted upon the dash 15, it will be channel shaped in horizontal cross section, as clearly shown in Figure 5.

The purpose of providing the inturned flanges 21 will be hereinafter more fully set forth.

The dash plate 18 is provided with an elongated slot 22 through which is extended a bolt 23 having an enlarged head 24 thereon. The head 24 is provided with a pair of flat sides which are received between the flanges 21 and preventing any rotation of the bolt 23.

The bolt 23 is permitted to slide up and down within the slot 22.

A thumb nut 25 is secured upon the bolt 23.

A sliding plate 26 rests against the dash plate 18 and has the bolt 23 extended therethrough. The thumb nut 25 is used for tightening the sliding plate of the dash plate 18.

The sliding plate 26 may be slid up and down upon the plate 18 and locked in any desired position.

A control bar 27 is hingedly connected to the upper edge of the sliding plate 26 by means of a pintle 28.

The upper edge of the sliding plate 26 and the lower edge of the control bar 27 are provided with projecting ears, which are rolled over the pintle 28 for forming the hinge connection.

Secured to the wind shield frame 12 by means of a bolt 28ª is the connector member 29. The lower edge of the connector member 29 is secured to the control bar 27 by means of a pintle rod 30.

The control bar 27 and the connector member 29 are formed with ears which are rolled over the pintle 30 for forming the hinge connection therebetween.

A portion of the control bar projects up above the hinge connection formed by the pintle 13 and serves as a finger engaging piece 31. The finger engaging piece 31 is curved in cross section.

From the construction of the parts just described, it will be seen that the control bar 27 is hingedly secured at one end to the wind shield 12, through the medium of the connector member 29 and is hingedly secured to the dash 15 through the medium of the dash plate 18 and the sliding plate 26.

In order to open the wind shield for permitting ventilation of the automobile, it is necessary to unloosen the thumb nut 25. The finger engaging piece 31 is then engaged and raised slightly upwardly, as shown in dotted lines in Figure 2 of the drawings, at which time the frame 12 will clear the weather strip 16 and will then be capable of movement to the positions shown in dotted lines in Figure 2.

The double hinge connection of the control bar and the sliding connection between the dash plate 26 permits the parts to be moved to the position just described. The thumb nut may then be tightened for locking and holding the parts in position where the wind shield will be open.

It will be seen that the wind shield may be opened within the limit of the length of the slot 22 and locked in any desired position thereof.

The control device, when the parts are in their closed position, will also lock the wind shield against any undesired movement.

One of the advantages of my control device resides in the fact that it is positioned midway between the ends of the wind shield and at a convenient place adjacent the driver of the automobile so that he can readily control the same.

A further advantage resides in the fact that a single control device is used for operating the wind shield.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In combination with a hinged windshield, a windshield control device comprising a dash plate having a pair of spaced flanges adapted to be secured to a dash of an automobile having a vertical slot therein, a connector member fixed to the windshield, a sliding plate mounted on said dash plate, a bolt extending through said sliding plate and received in said slot for locking said sliding plate relative to the dash plate, said bolt having its head received between said flanges, and a control bar hingedly connected at its ends to said connector member and to said sliding plate.

2. In combination with a hinged windshield, a windshield control device comprising a plate adapted to be secured to a dash of an automobile, a connector member fixed to the windshield of the automobile a second plate mounted on said first plate for vertical sliding movement thereon, a control bar hingedly connected at one of its ends to said second plate, and at its other end hingedly connected to said connector member, and a bolt member for locking said second plate relative to said first plate in any of its adjusted positions.

3. In combination with a hinged windshield, a windshield control device comprising a plate adapted to be secured to a dash of an automobile, a connector member fixed to the windshield of the automobile, a second plate slidably mounted for vertical adjustment on said first plate and secured thereto, a control bar hingedly connected at one of its ends to said second plate, and at its other end hingedly connected to said connector member, a bolt member for locking said first plate in any of its adjusted positions and a finger engaging piece at the upper end of the said control bar whereby the control device may be operated for opening or closing of the windshield.

Des Moines, Iowa, September 5, 1923.

JOHN R. KING